April 16, 1940.  E. KOSEN  2,197,149
SAFETY MILK BOTTLE HOLDER
Filed Feb. 5, 1938  2 Sheets-Sheet 1
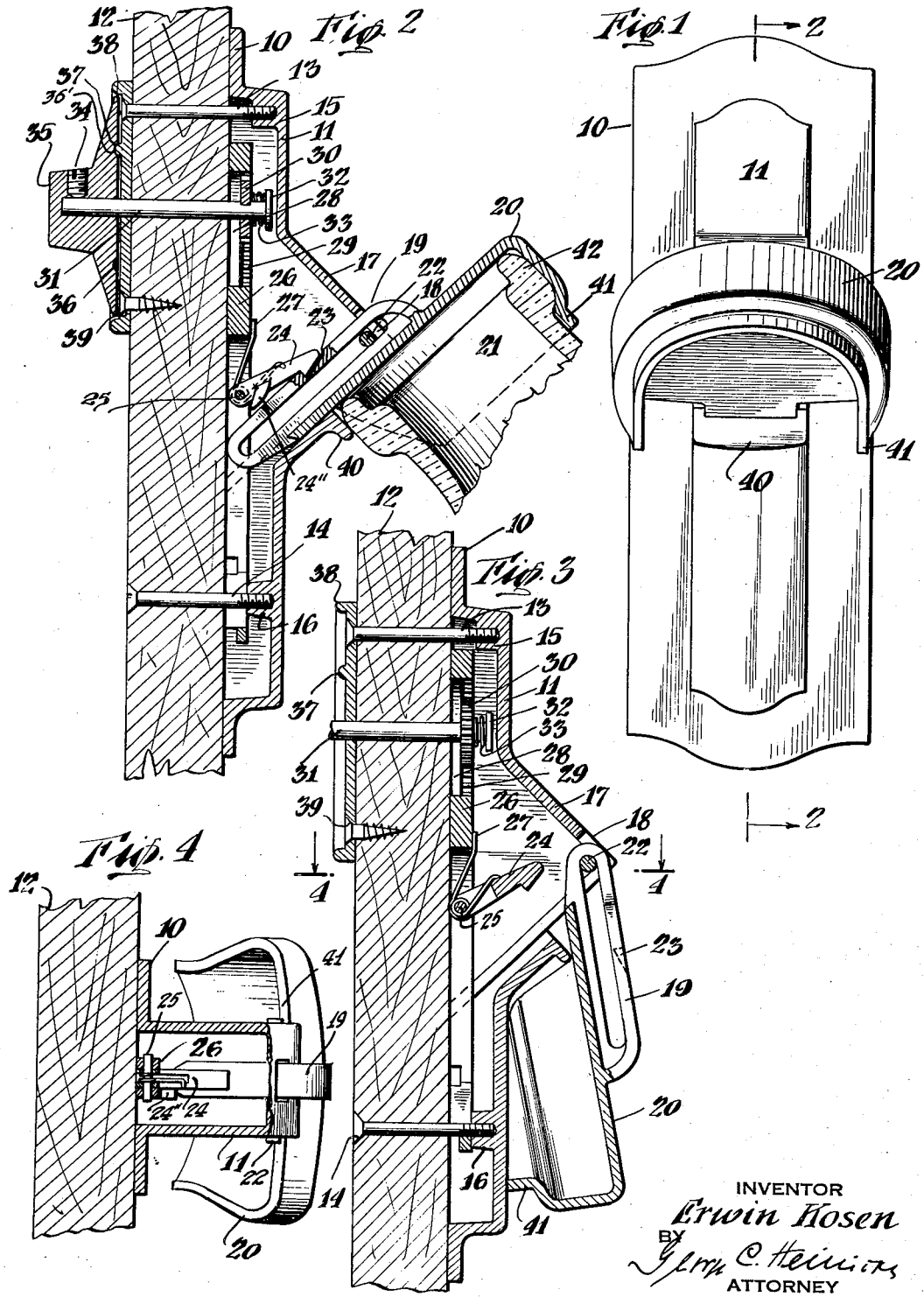
INVENTOR
Erwin Kosen
BY
ATTORNEY

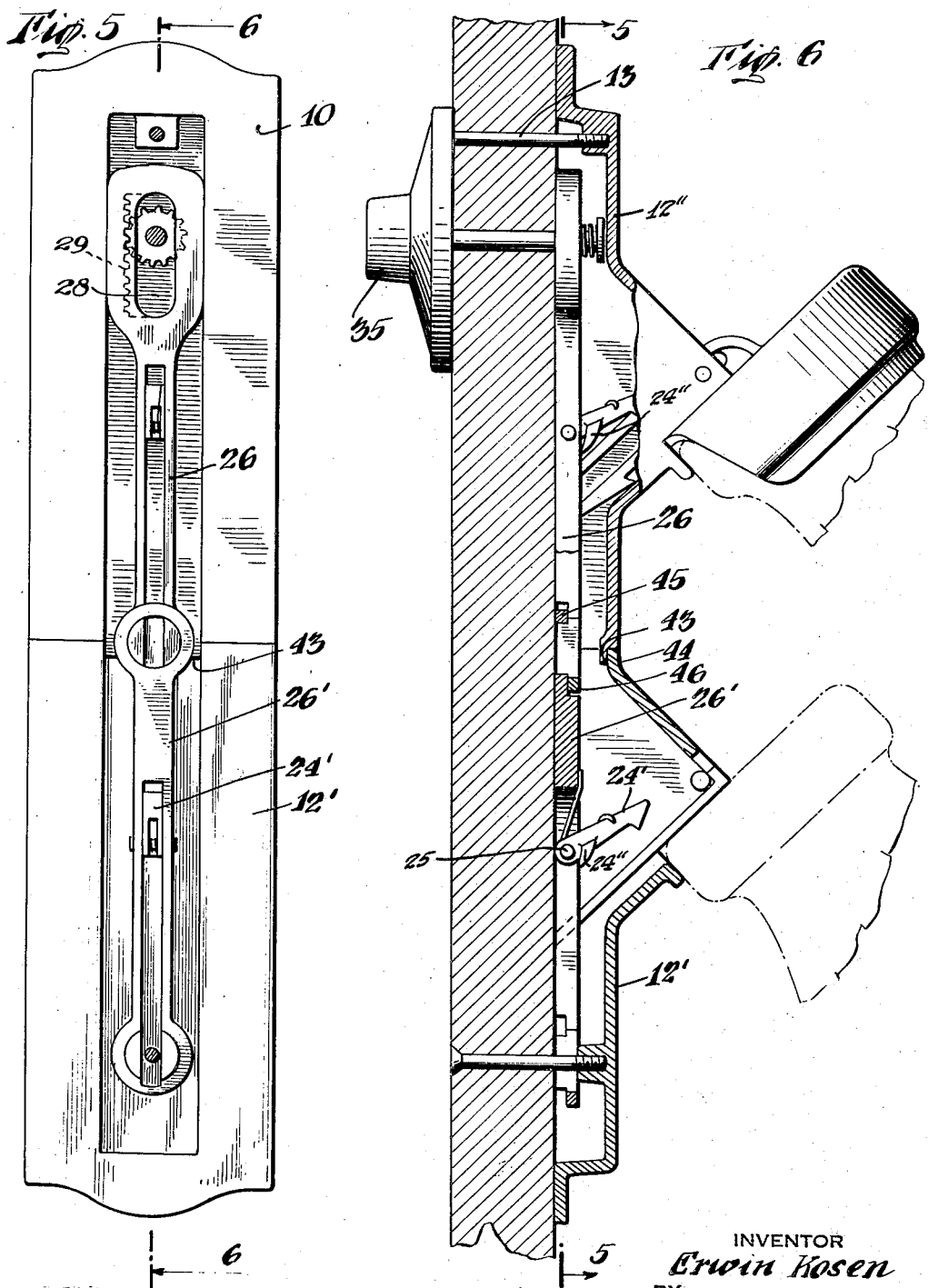

Patented Apr. 16, 1940

2,197,149

UNITED STATES PATENT OFFICE 2,197,149

SAFETY MILK BOTTLE HOLDER

Erwin Kosen, New York, N. Y.

Application February 5, 1938, Serial No. 188,851

3 Claims. (Cl. 232—41.5)

My invention relates to improvements in the devices for delivering milk bottles, and it is the principal object of my invention to provide a safety milk bottle holder adapted to be readily attached to any building, and securely holding the milk bottle after its delivery by the milkman against theft, until released from its holder by the householder.

Another object of my invention is the provision of a safety milk bottle holder of comparatively simple and therefore inexpensive construction, yet durable and highly efficient in operation.

A further object of my invention is the provision of a safety milk bottle holder adapted to be readily installed without necessitating material changes on the building, and a holder which can conveniently be duplicated to hold two or more bottles.

A still further object of my invention is the provision of a safety milk bottle delivery device equipped with novel and improved means adapted to be locked by the milkman upon delivery of a bottle and to be unlocked from the inside only by a simple operation.

My safety milk bottle holder is readily adaptable for the display of appropriate advertisements or the like.

These and other objects and advantages of my invention will become more fully apparent as the description thereof proceeds, and will then be more specifically defined in the appended claims.

In the accompanying drawings forming a material part of this disclosure:

Fig. 1 is an outer front elevation of a safety milk bottle holder constructed according to my invention.

Fig. 2 is a longitudinal section through the same on line 2—2 of Fig. 1, illustrating fragmentarily a bottle in the incipient state of delivery.

Fig. 3 is a view similar to Fig. 2 showing the holder collapsed after removal of a bottle.

Fig. 4 is a cross-section on line 4—4 of Fig. 3.

Fig. 5 is an inner view of a holder for the delivery of two milk bottles, seen in the direction of the arrows 5—5 of Fig. 6.

Fig. 6 is a longitudinal section on line 6—6 of Fig. 5.

As illustrated in Figs. 1 to 4, a frame 10 having a longitudinally extending median somewhat elevated rib 11 on its outer face, is adapted to be secured to a door 12 or the like by means of the screws 13, 14 engaging with their threaded ends similarly threaded lugs 15, 16 within the depression in the rib 11. Intermediate its ends, the rib 11 has formed therewith a substantially triangularly shaped protuberance or nose 17, slotted at its center, as at 18, for the reception of a loop-shaped member 19 secured to the rear face of the cap 20 for the reception of the bottle neck and mouth 21, as illustrated in Fig. 2. This cap is turnable about a pin 22 passed transversely through the nose 17 and the longitudinal slot in member 19. At its rear the member 19 has formed therewith a depression or socket 23 for engagement by a pawl 24 pivoted, as at 25, to a sliding member 26, said pawl has a tooth-like projection 24'' on its shank, the outer curved face of which serves to facilitate the turning movement of member 19, and to hold the pawl 24 in position when the cap and bottle are released. The sliding member is vertically displaceable in the rib depression, and a spring 27 wound intermediate its ends about the pivot pin 25 engages with one end the sliding member 26, and with its other end the pawl and has the tendency to press said pawl into engagement with the depression 23. Member 26 is longitudinally slotted, and is formed near its upper end with an eye 28 equipped with inner teeth or a rack part 29 adapted to be engaged by a pinion or gear 30 on a cross pin or spindle 31 intermediate the ends thereof extending through the sliding member 26 and provided at its outer end with a head 32 located in the inner depression in rib 11, and between said head 32 and the outer face of gear 30 a spring 33 is wound about the spindle 31 to hold the gear 30 in engagement with the rack part 29. The inner end of the spindle 31 has attached thereto by means of the set screw 34 an operating head or knob 35, the inner face of which is circular and provided with a lower depression 36 and an upper depression 36' spaced less than 180° apart, one corresponding to the engaging position of socket 23 and pawl 24 and one for the disengaging position of these elements, and both for engagement by the projection 37 on a disc 38 held against the inner face of the door by means of the screw bolt 13 and a screw 39. A lip 40 on the rib 11 limits the downward movement of the cap under the weight of a bottle held in said cap by the engagement of the cap flange 41 under the bead 42 of the bottle neck.

In Figs. 5 and 6 I have shown my device for the simultaneous delivery of two bottles, and the construction illustrated in these figures differs from the construction shown in Figs. 1 to 4 simply in the arrangement of a flange 43 of the upper rib 12'' with the shoulder 44 formed at the upper end of the lower rib 12', and the extension 26' of the sliding member 26 equipped with a pawl 24', and connected to the lower part of sliding member 26 as indicated at 45 and 46. All other parts are identically constructed as described above with respect to the illustrations Figs. 1 to 4.

In operation the milkman raises cap 20 from Fig. 3 position, inserts the bottle neck, and slides the loop 19 about pin 22 until pawl 24 engages depression 23 and locks the bottle neck between lip 40 and cap flange 41 as shown in Fig. 2. To release the bottle the householder rotates knob 35, elevating slide 26 to disengage pawl 24 and permitting the bottle to be removed and the cap to return to the Fig. 3 position. The knob 35 will be rotated back to relower the slide and restore the pawl to bottle locking position this being indicated by reengagement of depression 36' with projection 37.

It will be clear that I may attach any number of such holders to a door or the like as indicated in Figs. 5 and 6, so as to allow the delivery and securing of any desired number of bottles at a time.

It will be understood that I have described and shown the preferred forms of my invention as a few examples of the many possible ways to practically construct the same either in the identical form or make such changes in its general arrangement and in the construction of its minor details as come within the scope of the appended claims without departure from the spirit of my invention and the principles involved.

Having thus described my invention, what I claim as new, and desire to secure by Letters Patent is:

1. A safety milk bottle holder comprising a frame adapted to be secured to a building, having a perforated and slotted rib having a nose and a lip, a movable cap turning about a crosspin on said nose, a loop-shaped member on said cap in the loop of which said pin engages to allow a slanting out and inward movement of said cap and turning of the same to receive a bottle neck and hold the same between said cap and lip, a means to lock the said loop-shaped member in its inward position against movement towards the outside to hold said cap and lip in engagement with the bottle neck, and means to release said locking means from the inside of a building to allow a turning of the cap away from said lip to release the bottle.

2. In a safety milk bottle holder as described, a frame adapted to be secured to a building, a rib formed with said frame on its outside and having a depression on its inside, a slotted nose formed with said rib, a lip formed beneath said nose, a cross-pin on said nose, a cap turnably attached on said pin to slide into and out of said frame, said cap and lip engaging the bead of the milk bottle to securely hold the same in its inclined position, means to lock the cap in this position and means to release said locking means from the inside of a house to free the bottle.

3. In a safety milk bottle holder as described, a frame adapted to be secured to a building and having an inner longitudinally extending recess and a bottleneck bead engaging lip, a slotted movable frame in said recess, a spring controlled pawl pivoted in said movable frame, and a rack in an upper eyelet of said movable frame, a gear in mesh with said rack on a spindle to move said frame upwardly when turned by its knob in one direction and downwardly when said spindle is turned in the opposite direction, a bottle neck receiving cap having a slotted loop member slidably and turnably held to said first frame and adapted to be engaged by said pawl to lock said cap in its bottle retaining position when said movable frame is in one position, and to be released by said pawl from bottle locking position upon the movement of said movable frame in the opposite direction to allow a release of the bottle from the cap and bead engaging lip.

ERWIN KOSEN.